(12) United States Patent
Wiesner et al.

(10) Patent No.: US 10,335,854 B2
(45) Date of Patent: Jul. 2, 2019

(54) METHOD AND APPARATUS FOR PRODUCING THREE-DIMENSIONAL WORK PIECES

(71) Applicant: SLM SOLUTIONS GROUP AG, Lübeck (DE)

(72) Inventors: Andreas Wiesner, Lübeck (DE); Dieter Schwarze, Lübeck (DE)

(73) Assignee: SLM SOLUTIONS GROUP AG (DE)

( * ) Notice: Subject to any disclaimer, the term of this patent is extended or adjusted under 35 U.S.C. 154(b) by 1070 days.

(21) Appl. No.: 14/242,369

(22) Filed: Apr. 1, 2014

(65) Prior Publication Data
US 2014/0301883 A1 Oct. 9, 2014

(30) Foreign Application Priority Data

Apr. 3, 2013 (EP) .................................. 13 162 179

(51) Int. Cl.
*B22F 3/105* (2006.01)
*B23K 26/142* (2014.01)
(Continued)

(52) U.S. Cl.
CPC .......... *B22F 3/1055* (2013.01); *B23K 26/142* (2015.10); *B23K 26/144* (2015.10);
(Continued)

(58) Field of Classification Search
CPC ..... B33Y 10/00; B33Y 30/00; B29C 67/0077; B29C 67/0085; B29C 64/153;
(Continued)

(56) References Cited

U.S. PATENT DOCUMENTS 5,017,317 A 5/1991 Marcus
5,155,324 A 10/1992 Deckard et al.
(Continued)

FOREIGN PATENT DOCUMENTS

EP 0 590 956 A1 4/1994
EP 0 429 196 B1 3/1996
(Continued)

OTHER PUBLICATIONS

Japanese Office Action for Application No. 2014-071149 dated Aug. 2, 2016.
(Continued)

*Primary Examiner* — Alexandra M Moore
(74) *Attorney, Agent, or Firm* — Tarolli, Sundheim, Covell & Tummino LLP

(57) ABSTRACT

A method for producing three-dimensional work pieces comprises the steps of supplying gas to a process chamber accommodating a carrier and a powder application device, applying a layer of raw material powder onto the carrier by means of the powder application device, selectively irradiating electromagnetic or particle radiation onto the raw material powder applied onto the carrier by means of an irradiation device, discharging gas containing particulate impurities from the process chamber, and controlling the operation of the irradiation device by means of a control unit such that a radiation beam emitted by at least one radiation source of the irradiation device is guided over the layer of raw material powder applied onto the carrier according to a radiation pattern containing a plurality of scan vectors.

6 Claims, 4 Drawing Sheets

(51) Int. Cl.
   *B23K 26/14*      (2014.01)
   *B23K 26/144*     (2014.01)
   *B33Y 10/00*      (2015.01)
   *B23K 26/16*      (2006.01)
   *B29C 64/153*     (2017.01)
   *B29C 64/386*     (2017.01)
   *B23K 26/12*      (2014.01)
   *B33Y 30/00*      (2015.01)

(52) U.S. Cl.
   CPC .......... *B23K 26/1437* (2015.10); *B23K 26/16* (2013.01); *B29C 64/153* (2017.08); *B29C 64/386* (2017.08); *B33Y 10/00* (2014.12); *B22F 2003/1056* (2013.01); *B22F 2003/1057* (2013.01); *B23K 26/128* (2013.01); *B33Y 30/00* (2014.12); *Y02P 10/295* (2015.11)

(58) Field of Classification Search
   CPC ......... B29C 64/386; B29C 64/00; B22F 3/00; B22F 3/1055; B22F 3/1056; B22F 2003/1056; B22F 2003/1057; Y02P 10/00; Y02P 10/295; B23K 26/00; B23K 26/128; B23K 26/142; B23K 26/1437; B23K 26/144; B23K 26/16
   See application file for complete search history.

(56) References Cited

U.S. PATENT DOCUMENTS

| | | | | |
|---|---|---|---|---|
| 5,837,960 | A * | 11/1998 | Lewis | B23K 26/34 219/121.63 |
| 6,046,426 | A * | 4/2000 | Jeantette | B01F 13/0255 219/121.63 |
| 6,215,093 | B1 * | 4/2001 | Meiners | B22F 3/1055 219/121.61 |
| 9,669,583 | B2 | 6/2017 | Ferrar | |
| 2002/0015654 | A1 | 2/2002 | Das et al. | |
| 2007/0238056 | A1 * | 10/2007 | Baumann | B29C 67/0077 430/325 |
| 2008/0094460 | A1 * | 4/2008 | Nakata | B41J 11/002 347/102 |
| 2008/0241392 | A1 * | 10/2008 | Dimter | B22F 3/1055 427/256 |
| 2011/0135840 | A1 * | 6/2011 | Doye | B22F 3/1055 427/554 |
| 2012/0251378 | A1 * | 10/2012 | Abe | B29C 67/0077 419/55 |
| 2014/0271965 | A1 | 9/2014 | Ferrar | |
| 2016/0082658 | A1 * | 3/2016 | Swartz | B29C 67/0077 264/162 |
| 2017/0189961 | A1 | 7/2017 | Ferrar | |

FOREIGN PATENT DOCUMENTS

| | | | |
|---|---|---|---|
| EP | 2786858 | B1 | 10/2014 |
| EP | 2956262 | A2 | 12/2015 |
| EP | 2978589 | A1 | 2/2016 |
| GB | 2 378 151 | A | 2/2003 |
| JP | 2016-517357 | A | 6/2016 |
| WO | WO-0030789 | A1 * | 6/2000 ............ B22F 3/1055 |
| WO | WO 2006/024373 | A2 | 3/2006 |
| WO | WO 2008/116518 | A1 | 10/2008 |
| WO | 2014/125280 | A2 | 8/2014 |

OTHER PUBLICATIONS

User Manual for EOSINT M280, May 2011.
Technical description for EOSINT M280, 2010.
Submissions filed by opponent in response to the Summons to oral proceedings dated Apr. 20, 2018, for corresponding European patent application No. 13162179.9.
Communication from the European Patent Office regarding receipt of the Letter from the Opponent for corresponding European patent application No. 13162179.9, dated Apr. 26, 2018.
Declaration from Ralph Mayer dated Apr. 13, 2018.
Auxiliary Request in correspondence to European Application No. 13162179.9, dated Jun. 5, 2018.

* cited by examiner

METHOD AND APPARATUS FOR PRODUCING THREE-DIMENSIONAL WORK PIECES

RELATED APPLICATIONS

This application claims priority from EP Patent Application Serial No. 13 162 179.9, filed 3 Apr. 2013, which is incorporated herein in its entirety.

TECHNICAL FIELD

The present invention relates to a method and an apparatus for producing three-dimensional work pieces by irradiating layers of a raw material powder with electromagnetic or particle radiation.

BACKGROUND

Selective laser melting or laser sintering is an additive layering process by which pulverulent, in particular metallic and/or ceramic raw materials can be processed to three-dimensional work pieces of complex shapes. To that end, a raw material powder layer is applied onto a carrier and subjected to laser radiation in a site selective manner in dependence on the desired geometry of the work piece that is to be produced. The laser radiation penetrating into the powder layer causes heating and consequently melting or sintering of the raw material powder particles. Further raw material powder layers are then applied successively to the layer on the carrier that has already been subjected to laser treatment, until the work piece has the desired shape and size. Selective laser melting or laser sintering can be used in particular for the production of prototypes, tools, replacement parts or medical prostheses, such as, for example, dental or orthopaedic prostheses, on the basis of CAD data.

An apparatus for producing moulded bodies from pulverulent raw materials by selective laser melting is described, for example, in EP 1 793 979 AI. The prior art apparatus comprises a process chamber which accommodates a plurality of carriers for the shaped bodies to be manufactured. A powder layer preparation system comprises a powder reservoir holder that can be moved to and fro across the carriers in order to apply a raw material powder to be irradiated with a laser beam onto the carriers. The process chamber is connected to a protective gas circuit comprising a supply line via which a protective gas may be supplied to the process chamber in order to establish a protective gas atmosphere within the process chamber. The protective gas circuit further comprises a discharge line via which protective gas containing particulate impurities such as, for example, residual raw material powder particles and welding smoke particles may be withdrawn from the process chamber.

SUMMARY

The invention is directed at the object of providing a method and an apparatus, which allow a particularly efficient production of high-quality three-dimensional work pieces by irradiating layers of a raw material powder with electromagnetic or particle radiation.

This object is addressed by a method as defined in claim 1 and an apparatus as defined in claim 8.

In a method for producing three-dimensional work pieces gas is supplied to a process chamber accommodating a carrier and a powder application device. The process chamber may be sealable against the ambient atmosphere, i.e. against the environment surrounding the process chamber, in order to be able to maintain a controlled atmosphere, in particular an inert atmosphere within the process chamber.

By controlling the atmosphere within the process chamber, the occurrence of undesired chemical reactions, in particular oxidation reactions, upon irradiating the raw material powder with electromagnetic or particle radiation can be prevented. The gas supplied to the process chamber preferably is an inert gas such as, for example, Argon, Nitrogen or the like. It is however also conceivable to supply the process chamber with air. The gas may be supplied to the process chamber by means of a suitable conveying device such as, for example, a pump.

The carrier disposed in the process chamber may be a rigidly fixed carrier.

Preferably, however, the carrier is designed to be displaceable in vertical direction so that, with increasing construction height of a work piece, as it is built up in layers from the raw material powder, the carrier can be moved downwards in the vertical direction. The raw material powder preferably is a metallic powder, in particular a metal alloy powder, but may also be a ceramic powder or a powder containing different materials. The powder may have any suitable particle size or particle size distribution. It is, however, preferable to process powders of particle sizes <100 μm.

A layer of raw material powder is applied onto the carrier by means of the powder application device. Thereafter, the raw material powder applied onto the carrier is selectively irradiated with electromagnetic or particle radiation by means of an irradiation device. In particular, the raw material powder applied onto the carrier may be subjected to electromagnetic or particle radiation in a site-selective manner in dependence on the desired geometry of the work piece that is to be produced. The irradiation device preferably is adapted to irradiate radiation onto the raw material powder which causes a site-selective melting of the raw material powder particles. The irradiation device may comprise at least one radiation source, in particular a laser source, and at least one optical unit for guiding and/or processing a radiation beam emitted by the radiation source. The optical unit may comprise optical elements such an object lens, in particular and f-theta lens, and a scanner unit, the scanner unit preferably comprising a diffractive optical element and a deflection mirror.

While the raw material powder applied onto the carrier is selectively irradiated with electromagnetic or particle radiation, gas containing particulate impurities such as, for example, raw material powder particles or welding smoke particles is discharged from the process chamber. The gas containing particulate impurities may be discharged from the process chamber by means of a suitable conveying device such as, for example, a pump. Particulate impurities are removed from the process chamber in order to avoid excessive absorption of radiation energy and/or shielding of the radiation beam emitted by the radiation source of the irradiation device.

The operation of the irradiation device, by means of a control unit, is controlled such that a radiation beam emitted by at least one radiation source of the irradiation device is guided over the layer of raw material powder applied onto the carrier by means of the powder application device according to a radiation pattern. The radiation pattern contains a plurality of scan vectors, wherein the scan vectors, in at least a section of the radiation pattern, extend substantially parallel to each other. The radiation pattern may comprise a plurality of sections, wherein, in each section, the scan vectors may extend substantially parallel to each other, but may be inclined relative to the scan vectors in an adjacent section of the radiation pattern. The scan vectors may follow straight lines or curved lines. At least every other scan vector of the substantially parallel scan vectors extends at an angle between 0° and 90° or between 270° and 360° with respect to a direction of flow of a gas stream flowing through the process chamber.

The gas stream flowing through the process chamber may be induced by the supply of gas to the process chamber and/or may result from gas containing particulate impurities being discharged from the process chamber. In any case, the gas stream flowing through the process chamber carries particulate impurities, such as raw material powder particles or welding smoke particles. By orienting the scan vectors in the radiation pattern in dependence on the direction of flow of the gas stream flowing through the process chamber, the absorption of radiation energy and/or shielding of the radiation beam emitted by the radiation source of the irradiation device may be reduced. In particular, in the method according to the invention, scan vectors extending parallel to and/or being directed in the same direction as the direction of flow of the gas stream flowing through the process chamber are omitted, allowing the absorption of radiation energy and/or shielding of the radiation beam emitted by the radiation source to be significantly reduced.

In at least a section of the radiation pattern, the adjacent scan vectors may be directed in the same direction. In a radiation pattern, wherein adjacent scan vectors are directed in the same direction, the scan vectors may extend at an angle of approximately 0° with respect to a direction of flow of a gas stream flowing through the process chamber, allowing absorption of radiation energy and/or shielding of the radiation beam emitted by the radiation source to be minimized.

Alternatively or additionally thereto, in at least a section of the radiation pattern, adjacent scan vectors may be directed in opposite directions allowing the radiation beam emitted by the radiation source to be guided to and fro across the powder surface to be irradiated. In a radiation pattern, wherein adjacent scan vectors are directed in the same direction, the scan vectors may extend at an angle between 30° and 60°, between 120° and 150°, between 210° and 240° or between 300° and 330°. In particular, the scan vectors may extend at an angle between 40° and 50°, between 130° and 140°, between 220° and 230° or between 310° and 320°. Preferably, the scan vectors extend at an angle of approximately 45°, approximately 135°, approximately 225° or approximately 315°.

Basically, the radiation pattern may be any suitable radiation pattern, for example a chessboard pattern or a pattern comprising arbitrarily shaped sections. Preferably, however, the radiation pattern is a stripe pattern comprising a plurality of parallel stripes. Each stripe of the stripe pattern may be defined by a plurality of scan vectors extending substantially parallel to each other. The scan vectors defining a stripe of the stripe pattern may extend parallel to or inclined relative to a longitudinal axis of the stripe. It is, however, also conceivable that the scan vectors defining a stripe of the stripe pattern extend substantially perpendicular to a longitudinal axis of the stripe.

In a preferred embodiment of the method for producing three-dimensional work pieces, the operation of the irradiation device, by means of the control unit, is controlled such that the radiation beam emitted by the at least one radiation source of the irradiation device is guided over the layer of raw material powder applied onto the carrier such that an advance direction of the radiation beam along the longitudinal axes of the stripes in the stripe pattern extends at an angle between 0° and 90° or between 270° and 360°. By orienting also the advance direction of the radiation beam along the longitudinal axes of the stripes in the stripe pattern in dependence on the direction of flow of the gas stream flowing through the process chamber, the absorption of radiation energy and/or shielding of the radiation beam emitted by the radiation source of the irradiation device may further be reduced.

In a radiation pattern, wherein adjacent scan vectors are directed in the same direction, the advance direction of the radiation beam along the longitudinal axes of the stripes in the stripe pattern may extend at an angle of approximately 90° with respect to the direction of flow of the gas stream flowing through the process chamber. In a radiation pattern, wherein adjacent scan vectors are directed in opposite directions, the advance direction of the radiation beam along the longitudinal axes of the stripes in the stripe pattern in particular may extend at an angle between 130° and 140° or between 220° and 230° with respect to the direction of flow of the gas stream flowing through the process chamber. In a radiation pattern, wherein adjacent scan vectors are directed in opposite directions, the advance direction of the radiation beam along the longitudinal axes of the stripes in the stripe pattern preferably extends at an angle of approximately 135° or approximately 225° with respect to the direction of flow of the gas stream flowing through the process chamber.

The operation of the irradiation device, by means of the control unit, may be controlled such that the radiation beam emitted by the at least one radiation source of the irradiation device is guided over subsequent layers of raw material powder applied onto the carrier according to radiation patterns which are rotated relative to each other. By rotating the radiation patterns upon irradiating subsequent layers of raw material powder, excessive shrinkage and residual stresses in the generated work pieces may be minimized. Basically, the rotation pattern may be rotated about any suitable angle, provided the orientation of the scan vectors with respect to the direction of flow of the gas stream flowing through the process chamber is maintained as described above.

In the method for producing three-dimensional work pieces, an actual flow rate of the gas stream flowing through the process chamber may be detected. The detected actual flow rate may be compared with a predetermined set flow rate. Finally, a conveying device, which is operated so as to discharge gas containing particulate impurities from the process chamber, may be controlled in dependence on the result of the comparison between the detected actual flow rate and the predetermined set flow rate such that the detected actual flow rate converges to the predetermined set flow rate. The conveying device may be a pump. The conveying device may be controlled by means of a further control unit which may be formed separate from the control unit for controlling the operation of the irradiation device or may be formed integral with the control unit for controlling the operation of the irradiation device.

The predetermined set flow rate may be stored in a memory of the further control unit, may be determined by the further control unit on demand, or may be selected by an operator.

By controlling the operation of the conveying device in dependence on a set flow rate of the gas stream flowing through the process chamber, the flow rate of the gas stream can be controlled in a particularly reliable manner. Specifically, the operation of the conveying device and hence the flow rate of the gas stream can be controlled independent of an operational state of a filter device filtering particulate impurities from the gas stream discharged from the process chamber. Further, clogging of a discharge line via which gas containing particulate impurities is discharged from the process chamber no longer influences the control and the operation of the conveying device and hence the flow rate of the gas stream flowing through the process chamber.

A method for producing three-dimensional work pieces, wherein the operation of the conveying device is controlled in dependence on a set flow rate of the gas stream flowing through the process chamber as described above may be claimed independent from the above described control of the irradiation device. Specifically, a method for producing three-dimensional work pieces may be claimed, wherein gas is supplied to a process chamber accommodating a carrier and a powder application device, a layer of raw material powder is applied onto the carrier by means of the powder application device, electromagnetic or particle radiation is selectively irradiated onto the raw material powder applied onto the carrier by means of an irradiation device, gas containing particulate impurities is discharged from the process chamber, and the operation of the conveying device is controlled in dependence on a set flow rate of the gas stream flowing through the process chamber as described above.

The actual flow rate of the gas stream flowing through the process chamber may be measured by means of a detection device. The detection device may comprise a gas flow rate sensor disposed in a discharge line via which gas containing particulate impurities is discharged from the process chamber.

An apparatus for producing three-dimensional work pieces comprises a process chamber accommodating a carrier and a powder application device for applying a raw material powder onto the carrier, a gas supply line for supplying gas to the process chamber, an irradiation device for selectively irradiating electromagnetic or particle radiation onto the raw material powder applied onto the carrier, a discharge line for discharging gas containing particulate impurities from the process chamber, and a control unit which is adapted to control the operation of the irradiation device such that a radiation beam emitted by at least one radiation source of the irradiation device is guided over the layer of raw material powder applied onto the carrier according to a radiation pattern. The radiation pattern contains a plurality of scan vectors, wherein the scan vectors, in at least a section of the radiation pattern, extend substantially parallel to each other, and wherein at least every other scan vector of the substantially parallel scan vectors extends at an angle between 0° and 90° or between 270° and 360° with respect to a direction of flow of a gas stream flowing through the process chamber.

Adjacent scan vectors, in at least a section of the radiation pattern, may be directed in the same direction and/or in opposite directions.

The radiation pattern may be a stripe pattern comprising a plurality of parallel stripes, each stripe being defined by a plurality of scan vectors extending substantially parallel to each other. Further, scan vectors defining a stripe of the stripe pattern may extend substantially perpendicular to a longitudinal axis of the stripe.

The control unit may further be adapted to control the operation of the irradiation device such that the radiation beam emitted by the at least one radiation source of the irradiation device is guided over the layer of raw material powder applied onto the carrier such that an advance direction of the radiation beam along the longitudinal axes of the stripes in the stripe pattern extends at an angle between 0° and 90° or between 270° and 360°.

The control unit may be adapted to control the operation of the irradiation device such that the radiation beam emitted by the at least one radiation source of the irradiation device is guided over subsequent layers of raw material powder applied onto the carrier according to radiation patterns which are rotated relative to each other.

The apparatus may further comprise a detection device for detecting an actual flow rate of the gas stream flowing through the process chamber, a comparison device for comparing the detected actual flow rate with a predetermined set flow rate, and a further control unit which is adapted to control a conveying device which is operable so as to discharge gas containing particulate impurities from the process chamber in dependence on the result of the comparison between the detected actual flow rate and the predetermined set flow rate such that the detected actual flow rate converges to the predetermined set flow rate. The further control unit may be formed separate from the control unit for controlling the operation of the irradiation device or may be formed integral with the control unit for controlling the operation of the irradiation device.

An apparatus for producing three-dimensional work pieces, wherein the operation of the conveying device is controlled in dependence on a set flow rate of the gas stream flowing through the process chamber as described above may be claimed independent from the above described apparatus allowing a control of the irradiation device as described above. Specifically, an apparatus for producing three-dimensional work pieces may be claimed, which comprises a process chamber accommodating a carrier and a powder application device for applying a raw material powder onto the carrier, a gas supply line for supplying gas to the process chamber, an irradiation device for selectively irradiating electromagnetic or particle radiation onto the raw material powder applied onto the carrier, a discharge line for discharging gas containing particulate impurities from the process chamber, a detection device for detecting an actual flow rate of the gas stream flowing through the process chamber, a comparison device for comparing the detected actual flow rate with a predetermined set flow rate, and a control unit which is adapted to control a conveying device which is operable so as to discharge gas containing particulate impurities from the process chamber in dependence on the result of the comparison between the detected actual flow rate and the predetermined set flow rate such that the detected actual flow rate converges to the predetermined set flow rate.

The detection device may comprise a gas flow rate sensor disposed in the discharge line via which gas containing particulate impurities is discharged from the process chamber.

BRIEF DESCRIPTION OF THE DRAWINGS

Preferred embodiments of the invention in the following are explained in greater detail with reference to the accompanying schematic drawings, in which.

DETAILED DESCRIPTION OF DRAWINGS

Figure 1:
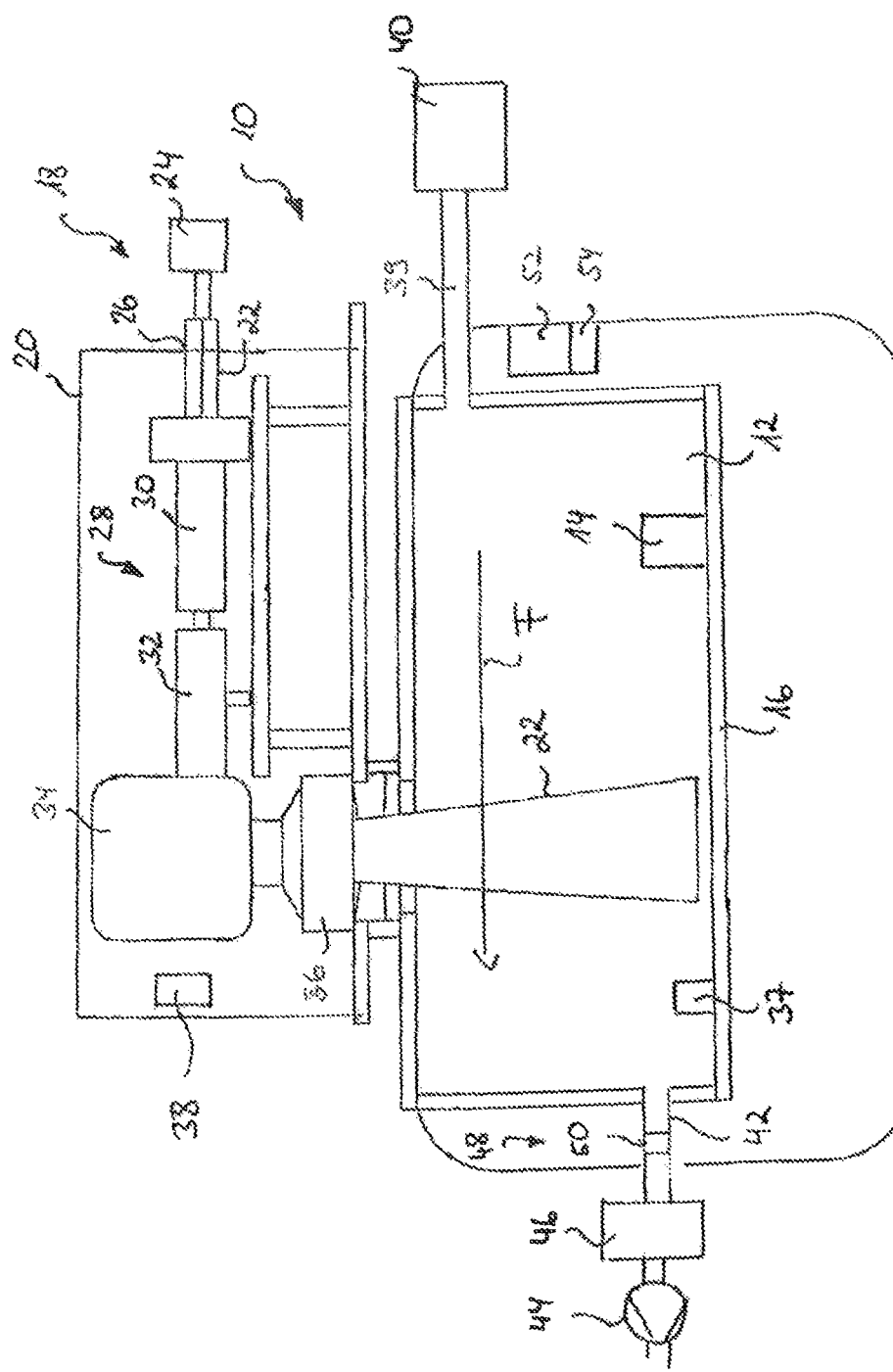
FIG. 1 shows an apparatus for producing three-dimensional work pieces.

FIG. 1 shows an apparatus 10 for producing three-dimensional work pieces by selective laser melting (SLM®). The apparatus 10 comprises a process chamber 12. A powder application device 14, which is disposed in the process chamber 12, serves to apply a raw material powder onto a carrier 16. The carrier 16 is designed to be displaceable in vertical direction so that, with increasing construction height of a work piece, as it is built up in layers from the raw material powder on the carrier 16, the carrier 16 can be moved downwards in the vertical direction.

The apparatus 10 further comprises an irradiation device 18 for selectively irradiating laser radiation onto the raw material powder applied onto the carrier 16. By means of the irradiation device 18, the raw material powder applied onto the carrier 18 may be subjected to laser radiation in a site-selective manner in dependence on the desired geometry of the work piece that is to be produced. The irradiation device 18 has a hermetically sealable housing 20. A radiation beam 22, in particular a laser beam, provided by a radiation source 24, in particular a laser source which may, for example, comprise a diode pumped Ytterbium fibre laser emitting laser light at a wavelength of approximately 1070 to 1080 nm is directed into the housing 20 via an opening 26.

The irradiation device 18 further comprises an optical unit 28 for guiding and processing the radiation beam 22, the optical unit 28 comprising optical elements such as a beam expander 30 for expanding the radiation beam 22, a focusing lens 32 for focusing the radiation beam 22 at a focus point, a scanner unit 34 and an object lens 36. The scanner unit 34 and the object lens 36 are shown by way of example in the form of a galvanometer scanner and an f-theta object lens. By means of the scanner unit 34, the position of the focus of the radiation beam 22 both in the direction of the beam path and in a plane perpendicular to the beam path can be changed and adapted. The operation of the irradiation device 18 is controlled by means of a control unit 38.

The process chamber 12 is sealable against the ambient atmosphere, i.e. against the environment surrounding the process chamber 12. The process chamber 12 is connected to a gas supply line 39 via which a gas provided by a gas source 40 may be supplied to the process chamber 12. The gas supplied to the process chamber 12 from the gas source 40 may be an inert gas such as, for example, Argon or Nitrogen.

A discharge line 42 serves to discharge gas containing particulate impurities such as, for example, raw material powder particles or welding smoke particles from the process chamber 12 during irradiating electromagnetic or particle radiation onto the raw material powder applied onto the carrier 16 in order to produce a work piece made of said raw material powder by an additive layer construction method. The gas containing particulate impurities is discharged from the process chamber 12 by means of a conveying device 44 such as, for example, a pump. A filter 46 disposed in the discharge line 42 upstream of the conveying device 44 serves to filter the particulate impurities from the gas stream discharged from the process chamber 12.

After passing the filter 46 the gas stream may be recirculated into the process chamber 12 via the gas supply line 39.

By supplying gas from the gas source 40 to the process chamber 12 via the gas supply line 39 and by discharging gas containing particulate impurities from the process chamber 12 via the discharge line 42, a gas flow through the process chamber is induced. Specifically, a gas stream flowing in a direction of flow which is indicated by an arrow F is generated within the process chamber 12. The gas stream carries particulate impurities, such as raw material powder particles, soot or welding smoke particles.

An actual flow rate of the gas stream flowing through the process chamber 12 is detected by means of a detection device 48. The detection device 48 comprises a gas flow rate sensor 50 disposed in the discharge line 42 via which gas containing particulate impurities is discharged from the process chamber 12. The detection device 48 may comprise further gas flow rate sensors which may be disposed within the process chamber 12, but are not shown in FIG. 1. A The further control unit 52, which in the apparatus 10 according to FIG. 1 is formed separate from the control unit 38 for controlling the operation of the irradiation device 18, but may also be formed integral with the control unit 38, serves to control the operation of the conveying device 44 in dependence on the detected actual flow rate of the gas stream flowing through the process chamber 12. Specifically, a comparison device 54 of the further control unit 52 serves to compare the detected actual flow rate with a predetermined set flow rate. The further control unit 52 then controls the conveying device 44 in dependence on the result of the comparison between the detected actual flow rate and the predetermined set flow rate such that the detected actual flow rate converges to the predetermined set flow rate.

Figure 2:
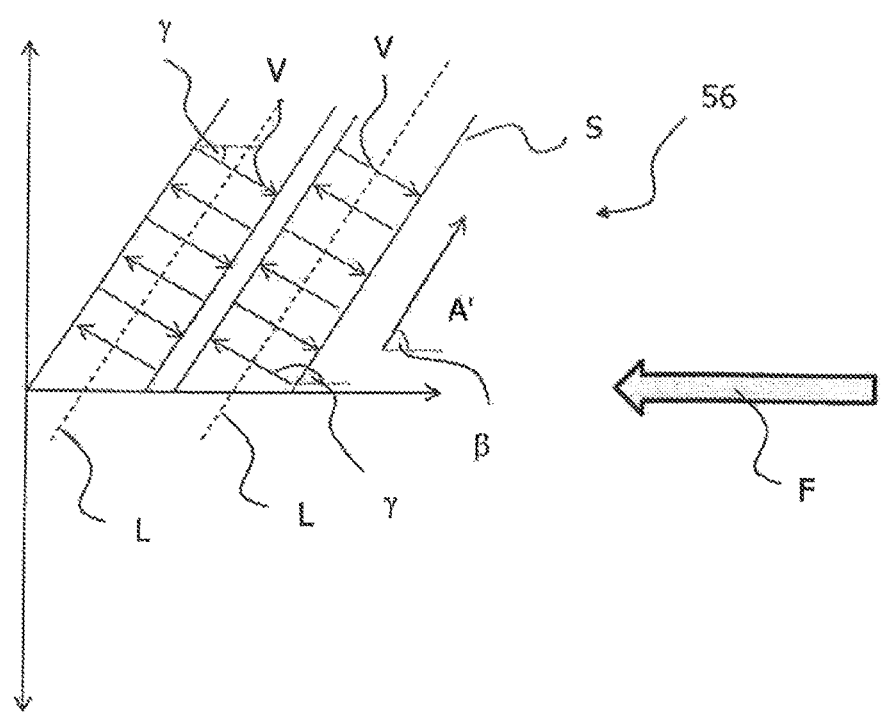
FIG. 2 shows a schematic representation of an exemplary radiation pattern according to which a radiation beam emitted by a radiation source of an irradiation device employed in the apparatus according to FIG. 1 is guided over a layer of raw material powder.
Figure 3:
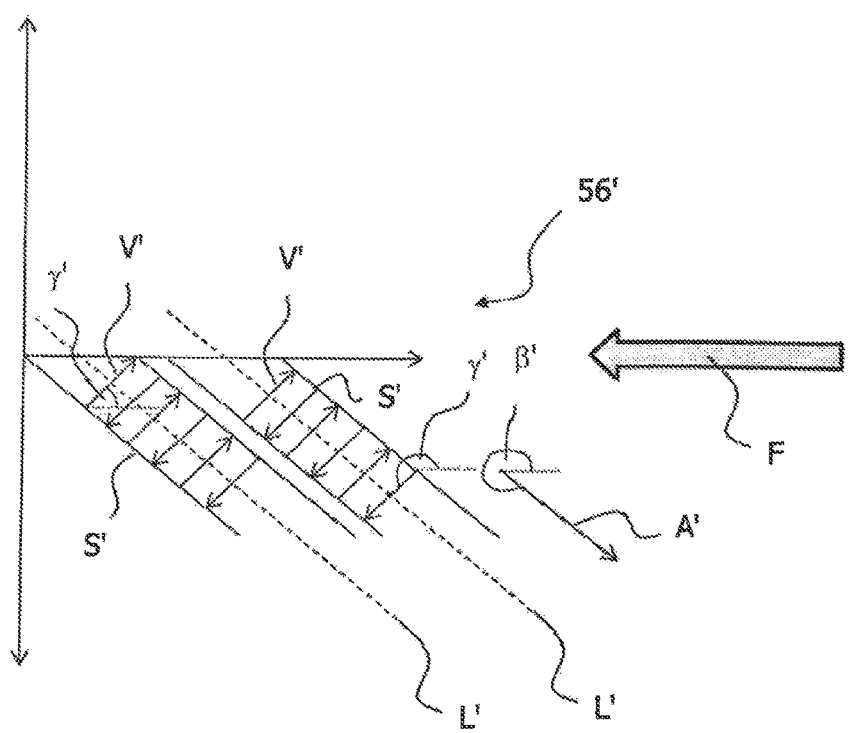
FIG. 3 shows a schematic representation of a further exemplary radiation pattern according to which a radiation beam emitted by a radiation source of an irradiation device employed in the apparatus according to FIG. 1 is guided over a layer of raw material powder.
Figure 4:
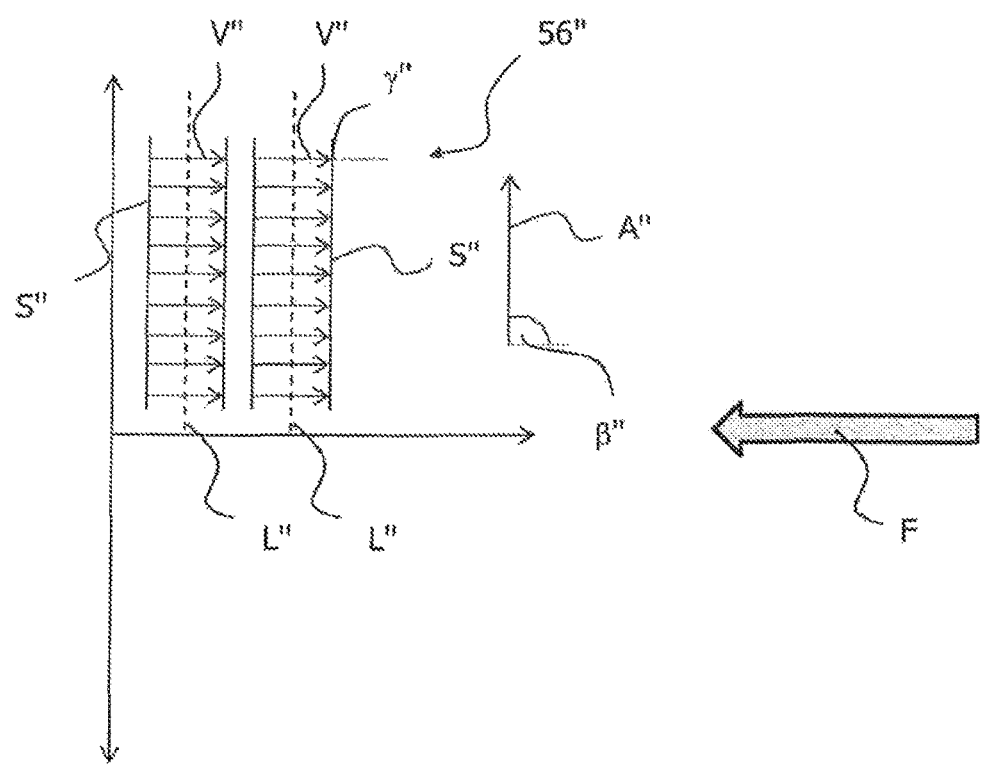
FIG. 4 shows a schematic representation of still a further exemplary radiation pattern according to which a radiation beam emitted by a radiation source of an irradiation device employed in the apparatus according to FIG. 1 is guided over a layer of raw material powder.

The operation of the irradiation device 18, by means of the control unit 38, is controlled such that the radiation beam 22 emitted by the radiation source 24 of the irradiation device 18 is guided over the layer of raw material powder applied onto the carrier 16 by means of the powder application device 14 according to a radiation pattern 56, 56', 56" as depicted in any one of FIGS. 2 to 4. The radiation pattern 56 shown in FIG. 2 is a stripe pattern comprising a plurality of parallel stripes S. Each stripe S of the stripe pattern is defined by a plurality of scan vectors V extending substantially parallel to each other and substantially perpendicular to a longitudinal axis L of the stripe S. Within each stripe S of the stripe pattern, adjacent scan vectors V are directed in opposite directions. As becomes apparent from FIG. 2, the scan vectors V of the radiation pattern 56 are oriented relative to the direction of flow F of the gas stream flowing through the process chamber 12, such that the scan vectors V extend at an angle γ of approximately 315° and approximately 135° with respect to the direction of flow F of the gas stream flowing through the process chamber 12.

Further, the operation of the irradiation device 18, by means of the control unit 38, is controlled such that the radiation beam 22 emitted by the radiation source 24 of the irradiation device 18 is guided over the layer of raw material powder applied onto the carrier 16 such that an advance direction A of the radiation beam 22 along the longitudinal axes L of the stripes S in the stripe pattern extends at an angle β of approximately 45° with respect to the direction of flow F of the gas stream flowing through the process chamber 12. By orienting the scan vectors V in the radiation pattern 56 and the advance direction A of the radiation beam 22 along the longitudinal axes L of the stripes S in the stripe pattern in dependence on the direction of flow F of the gas stream flowing through the process chamber 12, the absorption of radiation energy and/or shielding of the radiation beam 22 emitted by the radiation source 24 of the irradiation device 18 may be reduced.

Finally, the operation of the irradiation device 18, by means of the control unit 38, is controlled such that the radiation beam 22 emitted by the radiation source 24 of the irradiation device 18 is guided over subsequent layers of raw material powder applied onto the carrier 16 according to radiation patterns which are rotated relative to each other. Specifically, the radiation pattern 56 which is depicted in FIG. 2 and which is used for irradiating a first layer of raw material powder is rotated about approximately 90° so as to form the radiation pattern 56' depicted in FIG. 3. Upon irradiating a second layer of raw material powder which is applied onto the first (already irradiated) layer of raw material powder, the radiation beam 22 emitted by the radiation source 24 of the irradiation device 18 is guided according to the radiation pattern 56'.

Like the radiation pattern 56, the radiation pattern 56' also is a stripe pattern comprising a plurality of parallel stripes S', wherein each stripe S' is defined by a plurality of scan vectors V' extending substantially parallel to each other and substantially perpendicular to a longitudinal axis L' of the stripe S'. Within each stripe S', adjacent scan vectors V' are directed in opposite directions. The scan vectors V' of the radiation pattern 56' are oriented relative to the direction of flow F of the gas stream flowing through the process chamber 12, such that the scan vectors V' extend at an angle γ' of approximately 45° and approximately 225° with respect to the direction of flow F of the gas stream flowing through the process chamber 12.

An advance direction A' of the radiation beam 22 along the longitudinal axes L' of the stripes S' in the stripe pattern extends at an angle β' of approximately 315° with respect to the direction of flow F of the gas stream flowing through the process chamber 12. By rotating the radiation pattern 56, 56' upon irradiating subsequent layers of raw material powder, excessive shrinkage and residual stresses in the generated work pieces may be minimized.

A further exemplary radiation pattern 56" is depicted in FIG. 4. Like the radiation patterns 56, 56' the radiation pattern 56" also is a stripe pattern comprising a plurality of parallel stripes S", wherein each stripe S" is defined by a plurality of scan vectors V" extending substantially parallel to each other and substantially perpendicular to a longitudinal axis L" of the stripe S". Within each stripe S", adjacent scan vectors V" are directed in the same direction. The scan vectors V" of the radiation pattern 56" are oriented relative to the direction of flow F of the gas stream flowing through the process chamber 12, such that the scan vectors V" extend at an angle γ" of approximately 0° with respect to the direction of flow F of the gas stream flowing through the process chamber 12.

An advance direction A" of the radiation beam 22 along the longitudinal axes L" of the stripes S" in the stripe pattern extends at an angle β" of approximately 90° with respect to the direction of flow F of the gas stream flowing through the process chamber 12.

What is claimed is:

1. Method for producing three-dimensional work pieces, the method comprising the following steps:
   supplying gas to a process chamber accommodating a carrier and a powder application device,
   applying a layer of raw material powder onto the carrier by the powder application device,
   selectively irradiating electromagnetic or particle radiation onto the raw material powder applied onto the carrier by an irradiation device,
   discharging gas containing particulate impurities from the process chamber,
   filtering the particulate impurities from the discharged gas, and
   controlling the operation of the irradiation device by a control unit such that a radiation beam emitted by at least one radiation source of the irradiation device is guided over the layer of raw material powder applied onto the carrier according to a radiation pattern containing a plurality of scan vectors;
   detecting an actual flow rate of a gas stream flowing through the process chamber,
   comparing the detected actual flow rate with a predetermined set flow rate; and
   controlling a conveying device which is operated so as to discharge the gas containing particulate impurities from the process chamber in dependence on the result of the comparison between the detected actual flow rate and the predetermined set flow rate such that the detected actual flow rate converges to the predetermined set flow rate,
   wherein the scan vectors, in at least a section of the radiation pattern, extend substantially parallel to each other, and
   wherein at least every other scan vector of the substantially parallel scan vectors extends at an angle between 0° and 90° or between 270° and 360° with respect to a direction of flow of a gas stream flowing through the process chamber.

2. Method according to claim 1, wherein adjacent scan vectors, in at least a section of the radiation pattern, are directed in the same direction, or wherein adjacent scan vectors, in at least a section of the radiation pattern, are directed in opposite directions.

3. Method according to claim 1, wherein the radiation pattern is a stripe pattern comprising a plurality of parallel stripes, each stripe being defined by a plurality of scan vectors extending substantially parallel to each other and extending substantially perpendicular to a longitudinal axis of the stripe.

4. Method according to claim 3, wherein the operation of the irradiation device, by the control unit, is controlled such that the radiation beam emitted by the at least one radiation source of the irradiation device is guided over the layer of raw material powder applied onto the carrier such that an advance direction of the radiation beam along the longitudinal axes of the stripes in the stripe pattern extends at an angle between 0° and 90° or between 270° and 360° with respect to the direction of flow of the gas stream flowing through the process chamber.

5. Method according to claim 1, wherein the operation of the irradiation device, by the control unit, is controlled such that the radiation beam emitted by the at least one radiation source of the irradiation device is guided over subsequent layers of raw material powder applied onto the carrier according to radiation patterns which are rotated relative to each other.

6. Method according to claim 1, wherein the actual flow rate of the gas stream flowing through the process chamber is measured by a detection device comprising a gas flow rate sensor disposed in a discharge line via which gas containing particulate impurities is discharged from the process chamber.

* * * * *